US008209425B2

(12) United States Patent
Xia (10) Patent No.: US 8,209,425 B2
(45) Date of Patent: Jun. 26, 2012

(54) METHOD, SYSTEM AND DEVICE FOR ESTABLISHING SERVICE CONNECTION

(75) Inventor: Hongmiao Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 12/764,551

(22) Filed: Apr. 21, 2010

(65) Prior Publication Data

US 2010/0205315 A1    Aug. 12, 2010

Related U.S. Application Data

(63) Continuation of application No. PCT/CN2009/070165, filed on Jan. 15, 2009.

(30) Foreign Application Priority Data

Jan. 23, 2008    (CN) .......................... 2008 1 0004722

(51) Int. Cl.
   *G06F 15/16*    (2006.01)
(52) U.S. Cl. ......... 709/228; 709/203; 709/227; 370/230
(58) Field of Classification Search .................. 709/203, 709/227, 228; 370/230
   See application file for complete search history.

(56) References Cited

U.S. PATENT DOCUMENTS

| 6,212,164 | B1* | 4/2001 | Murakami et al. | 370/230 |
|---|---|---|---|---|
| 6,414,758 | B1* | 7/2002 | Stovall | 358/434 |
| 6,546,392 | B1* | 4/2003 | Bahlmann | 1/1 |
| 6,639,901 | B1* | 10/2003 | Katzri et al. | 370/255 |
| 6,724,723 | B1* | 4/2004 | Hamami | 370/230 |
| 6,778,651 | B1* | 8/2004 | Jost et al. | 379/201.01 |
| 7,009,982 | B2* | 3/2006 | Scott et al. | 370/401 |
| 7,336,648 | B1 | 2/2008 | Sasagawa | |
| 7,643,489 | B2* | 1/2010 | Wang et al. | 370/395.2 |

(Continued)

FOREIGN PATENT DOCUMENTS

CN    2001-197116    7/2001

(Continued)

OTHER PUBLICATIONS

Extended European Search Report issued in corresponding European Patent Application No. 09706945.4, mailed Oct. 7, 2010.

(Continued)

*Primary Examiner* — Wing Chan
*Assistant Examiner* — Tesfay Yohannes
(74) *Attorney, Agent, or Firm* — Brinks Hofer Gilson & Lione (57) ABSTRACT

A method, a system, and a device for establishing a service connection are provided. The method includes the following steps. An interface configuration parameter is obtained, in which the interface configuration parameter includes an interface configuration parameter of a remote device. An interface parameter object is added to a user network interface (UNI) request message, in which the interface parameter object carries the interface configuration parameter. The UNI request message carrying the interface configuration parameter of the remote device is sent to the remote device, so as to establish a service connection with the remote device. Thus, the interface parameter object is added to the UNI request message, and then the UNI request message carrying the interface configuration parameter of the remote device is sent to the remote device, for establishing the service connection, so as to realize automatic negotiation and configuration of the interface parameters, thereby saving manpower resources.

6 Claims, 4 Drawing Sheets

U.S. PATENT DOCUMENTS

| | | | |
|---|---|---|---|
| 7,778,633 B2* | 8/2010 | Ward | 455/423 |
| 8,015,268 B2* | 9/2011 | Duffy et al. | 709/220 |
| 2001/0032265 A1* | 10/2001 | Tanaka | 709/227 |
| 2003/0126195 A1* | 7/2003 | Reynolds et al. | 709/203 |
| 2005/0169279 A1* | 8/2005 | Magd et al. | 370/395.5 |
| 2007/0121850 A1* | 5/2007 | Klos et al. | 379/114.28 |
| 2007/0204273 A1* | 8/2007 | Chen et al. | 719/313 |

FOREIGN PATENT DOCUMENTS

| | | |
|---|---|---|
| CN | 1801801 A | 7/2006 |
| CN | 1801808 A | 7/2006 |
| CN | 1812355 A | 8/2006 |
| CN | 101494552 B | 5/2011 |
| EP | 1 727 316 A1 | 5/2005 |
| WO | 2007/022729 A1 | 3/2007 |
| WO | WO 2007/079649 A1 | 7/2007 |

OTHER PUBLICATIONS

Berger, "Generalized Multi-Protocol Label Switching (GMPLS) Signaling Resource Reservation Protocol—Traffic Engineering (RSVP-TE) Extensions", Network Working Group, The Internet Society. Jan. 2003.

International Search Report issued in corresponding PCT Application No. PCT/CN2009/070165; issued Apr. 2, 2009.

Partial Translation of Chinese Patent No. CN1812355, cited in previous Information Disclosure Statement dated Apr. 21, 2010.

Office Action (with partial translation) issued in corresponding Chinese Patent Application No. 200810004722.9, mailed Jul. 14, 2010.

Written Opinion of the International Searching Authority issued in corresponding PCT Patent Application No. PCT/CN2009/070165, mailed Apr. 2, 2009.

Office Action issued in corresponding European Patent Application No. 09706945.4, mailed Oct. 11, 2011.

Office Action issued in corresponding European Patent Application No. 09706945.4, mailed Mar. 15, 2012.

* cited by examiner

METHOD, SYSTEM AND DEVICE FOR ESTABLISHING SERVICE CONNECTION

CROSS-REFERENCE TO RELATED APPLICATIONS

This application is a continuation of International Application No. PCT/CN2009/070165, filed on Jan. 15, 2009, which claims priority to Chinese Patent Application No. 200810004722.9, filed on Jan. 23, 2008, both of which are hereby incorporated by reference in their entireties.

FIELD OF THE TECHNOLOGY

The present disclosure relates to the field of communication technologies, and more particularly to a method, a system, and a device for establishing a service connection.

BACKGROUND

In a current multi-layer network formed by an Internet Protocol (IP) network and a transmission network, the network in each layer independently performs planning and resource assignment, and the service activation needs to be separately configured by each data layer. In consideration of a three-layer network of multiple protocol label switch (MPLS)/optical data unit (ODU)/λ, when an end-to-end multiple protocol label switch-traffic engineering (MPLS-TE) connection needs to be established, if the MPLS layer does not have enough resources for being assigned, a bandwidth needs to be added by a bottom layer. Firstly, an optical layer cross connect needs to be configured, and after a wavelength tunnel of the optical layer has already been established and distributed to an upper layer, a route of the ODU tunnel is computed in the ODU layer and cross resources are configured, and then after the ODU layer tunnel has already been established and distributed to the MPLS layer, the end-to-end MPLS-TE connection may be established and provided for clients. Such a method for activating the cross-layer service is apparently complicated. Furthermore, the constraint relations in/among networks in different layers may be considered, and the efficiency of manual configuration is quite low. Network maintenance departments for networks in different layers of the operator may need to repeatedly communicate with one another, so that the establishment of one connection may cost several days to several months.

A multi-layer control technology can realize an automatic activation of the cross-layer service. If the resource is found to be insufficient when an upper layer connection is established, an interlayer interaction is thoroughly performed by using a multi-layer control mechanism, for example, a lower layer is driven to establish an appropriate tunnel and distribute the tunnel to the upper layer to act as a forward adjacency (FA), and after the topology of the upper layer network is synchronously updated, the end-to-end connection is automatically established.

Figure 1:
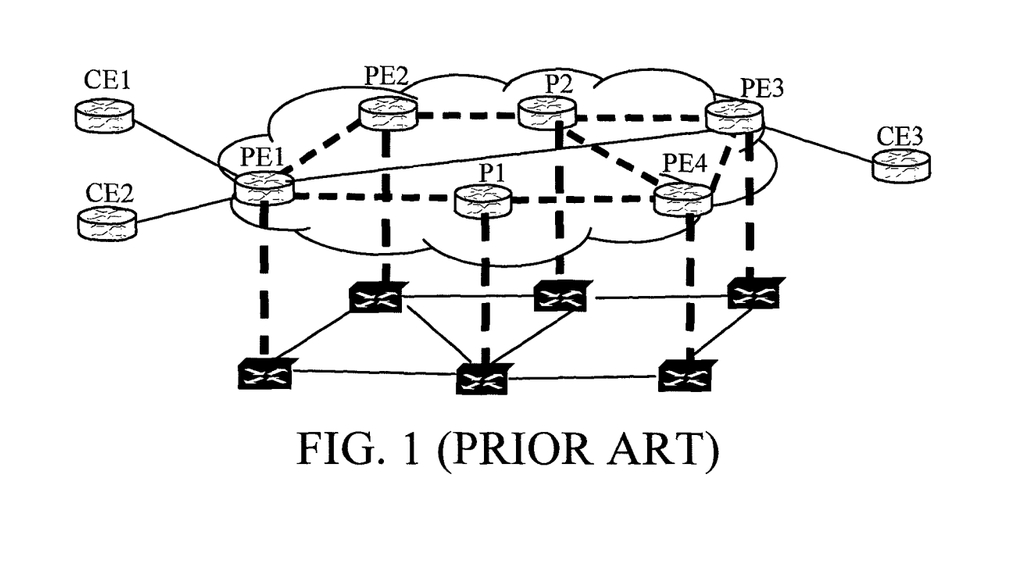
FIG. 1 is a topology structural view of a multi-layer network in the prior art.

With the multi-layer control technology, the operator can realize the automatic activation of cross-layer connection by simply clicking the network management. In addition, the driving of the network traffic may optimize the network topology by using the multi-layer control technology, so that the network topology is dynamically changed. For example, the network topology is optimized to cater to the change of the traffic, so that certain interfaces are dynamically generated. Referring to FIG. 1, a router establishes an initial topology through a transmission network. Once a traffic between a provider edge (PE) 1 and a PE3 is suddenly increased and exceeds a pre-planned value and further reaches a certain threshold, the hop-by-hop forwarding motion of the router needs to be reduced in consideration of a network utilization efficiency, so that one direct optical channel is established between the PE1 and the PE3.

If the router network and the transmission network are configured in an overlay model, a bottom layer connection is created through a user network interface (UNI), so as to provide an interface for the router. If the router and the optical network are configured in a peer model, an end-to-end signaling is directly initiated. Regardless of which of the above situations, the dynamically-established connection is established upon being driven by a signaling.

In the prior art, interfaces correspondingly generated on two ends of the dynamically established connection cannot work normally unless several parameters are configured, and the configuration information of the device is usually configured manually. Particularly, the configuration is performed by directly logging in the network device via a hyper terminal, or performed by using a network management tool, or performed in a remote login manner. As for the dynamically generated interfaces in the multi-layer control technology, it is impractical to instruct a network manager to always monitor the dynamical change of the network and configure the interface parameters in the machine room.

SUMMARY

Accordingly, the present disclosure is directed to a method, a system, and a device for establishing a service connection, which are applicable to realize automatic negotiation and configuration of interface parameters, thereby saving manpower resources.

In an embodiment, the present disclosure provides a method for establishing a service connection, which includes the following steps.

Interface configuration parameters are obtained, in which the interface configuration parameters include an interface configuration parameter of a remote device.

An interface parameter object is added to a UNI request message, in which the interface parameter object carries the interface configuration parameters.

The UNI request message carrying the interface configuration parameter of the remote device is sent to the remote device, so as to establish a service connection with the remote device.

In an embodiment, the present disclosure also provides a system for establishing a service connection, which includes a local device and a remote device.

The local device is configured to obtain interface configuration parameters including an interface configuration parameter of the remote device, add an interface parameter object carrying the interface configuration parameters to a UNI request message, and send the UNI request message carrying the interface configuration parameter of the remote device to the remote device, so as to establish a service connection with the remote device.

The remote device is configured to receive the UNI request message sent by the local device, obtain the interface configuration parameter of the remote device, and configure an interface of the remote device according to the interface configuration parameter of the remote device.

In an embodiment, the present disclosure further provides a local device, which includes an obtaining module, an adding module, and a sending module.

The obtaining module is configured to obtain interface configuration parameters, in which the interface configuration parameters include an interface configuration parameter of a remote device.

The adding module is configured to add an interface parameter object to a UNI request message, in which the interface parameter object carries the interface configuration parameters.

The sending module is configured to send the UNI request message carrying the interface configuration parameter of the remote device to the remote device.

In an embodiment, the present disclosure further provides a computer readable storage medium, which includes computer program codes, in which the computer program codes are executed by a computer processor, so that the computer processor is triggered to perform the method for establishing a service connection.

Compared with the prior art, the present disclosure has the following advantages. In the embodiments of the present disclosure, the interface parameter object is added to the UNI request message, in which the interface parameter object carries the interface configuration parameters including the interface configuration parameter of the local device and the interface configuration parameter of the remote device. Then, the UNI request message carrying the interface configuration parameter of the remote device is sent to the remote device, so as to complete the negotiation and configuration of the interface parameters, thereby realizing automatic configuration and negotiation of the interface parameters, solving critical problems in the multi-layer TE, and saving manpower resources.

DETAILED DESCRIPTION OF THE EMBODIMENTS

In an embodiment, the present disclosure provides a method for establishing a service connection. Specifically, an interface parameter object is added to a UNI request message, in which the interface parameter object carries interface configuration parameters including an interface configuration parameter of a local device and an interface configuration parameter of a remote device. The local device sets an interface of the local device according to the interface configuration parameter of the local device, and then sends the interface configuration parameter of the remote device to the remote device through the UNI request message. After receiving the UNI request message, the remote device sets an interface of the remote device according to the interface configuration parameter of the remote device in the UNI request message, establishes a corresponding service connection, and then sends receiving acknowledgement information to the local device, thereby completing automatic negotiation and configuration of the interface parameters. In the embodiments of the present disclosure, the UNI request message adopts a resource reservation protocol (RSVP)-TE signaling, and the RSVP-TE signaling is taken as an example in the following description.

Figure 2:
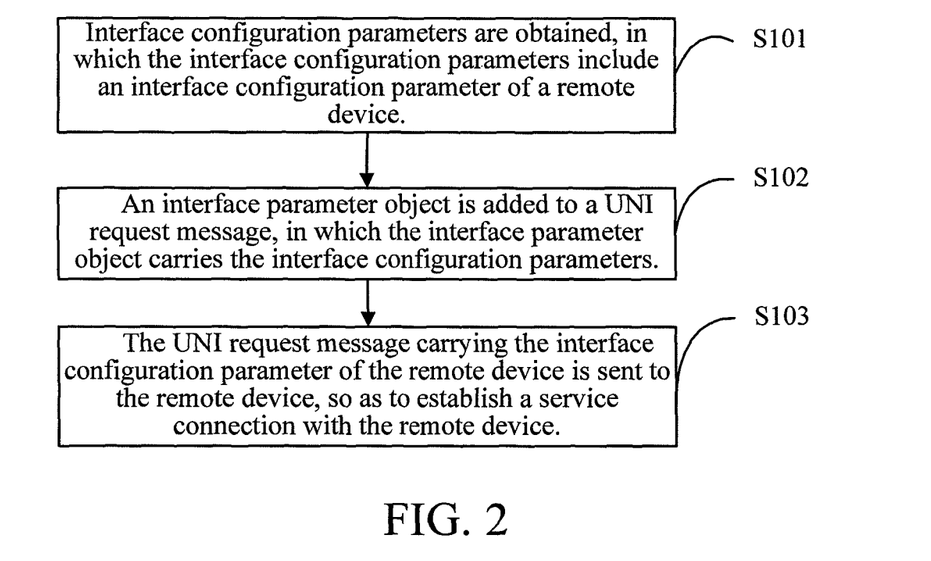
FIG. 2 is a flow chart of a method for establishing a service connection according to an embodiment of the present disclosure.

FIG. 2 is a flow chart of a method for establishing a service connection according to an embodiment of the present disclosure. Referring to FIG. 2, specifically, the method includes the following steps.

In step S101, interface configuration parameters are obtained, in which the interface configuration parameters include an interface configuration parameter of a remote device.

A network optimization server triggers a local device, a label switching router (LSR) 1, in a network to establish a connection to a remote device LSR2 through a multi-layer control technology, and sends configuration parameters required for correspondingly generated interfaces on two ends for establishing the connection to the LSR1 while triggering the LSR1 to establish the connection. Alternatively, a network management server triggers the local device LSR1 in the network to establish a connection to the remote device LSR2. The interface configuration parameters of the local device LSR1 and the remote device LSR2 for establishing the connection are pre-configured in the network management server, so that the network management server sends the configuration parameters required for correspondingly generating the interfaces on the two ends for establishing the connection to the LSR1 while triggering the LSR1 to establish the connection.

In step S102, an interface parameter object is added to a UNI request message, in which the interface parameter object carries the interface configuration parameters.

In the embodiment of the present disclosure, the local device LSR1 adds the Interface Parameter Object to the UNI request message. The object may carry the configuration parameters of an upper layer interface after the connection is established, which includes the parameter of the remote device LSR2. The parameters to be configured include one or more of the following parameters of the remote device LSR2: an IP address, a routing protocol, and a routing parameter.

In step S103, the UNI request message carrying the interface configuration parameter of the remote device is sent to the remote device, so as to establish a service connection with the remote device.

The local device LSR1 maps the interface configuration parameters to the interface parameter object for being coded, and then sends the configuration parameter of the remote device LSR2 to the remote device LSR2 through the UNI request message. After receiving the UNI request message, the remote device LSR2 decodes the interface parameter object carried in the UNI request message, and obtains the interface configuration parameter of the remote device. If accepting the interface configuration parameter sent by the LSR1, the remote device LSR2 configures an interface of the LSR2 according to the received interface configuration parameter of the remote device, and establishes the corresponding service connection.

In the embodiment of the present disclosure, the interface parameter object is added to the UNI request message, and then the UNI request message carrying the interface configuration parameter of the remote device is sent to the remote device, so as to complete the negotiation and configuration of the interface parameters, thereby realizing automatic configuration and negotiation of the interface parameters, and saving manpower resources.

Figure 3:
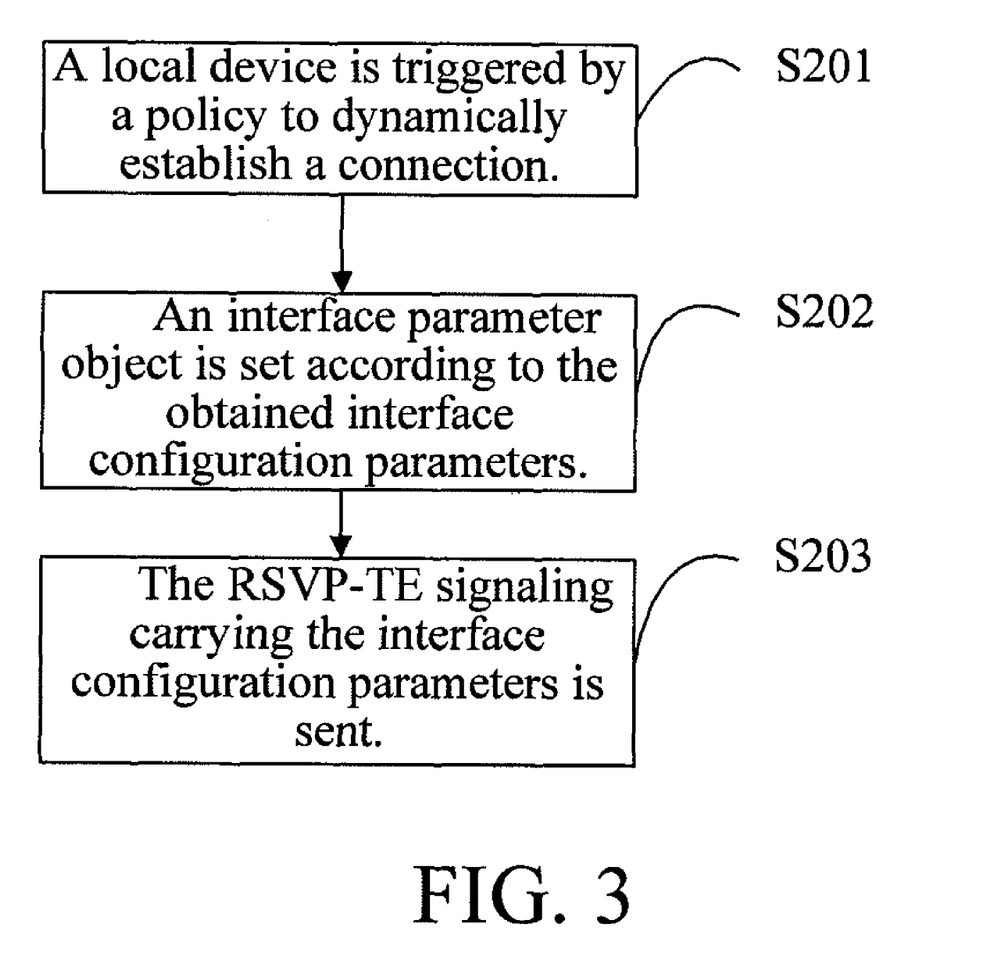
FIG. 3 is a flow chart of a method for establishing a service connection according to another embodiment of the present disclosure.

FIG. 3 is a flow chart of a method for establishing a service connection according to another embodiment of the present disclosure.

In step S201, a local device is triggered by a policy to dynamically establish a connection.

According to a topology structure and traffic information of the network, interface configuration parameters of a local device LSR1 and a remote device LSR2 are pre-configured in a network optimization server or a network management server. The network optimization server triggers the local device LSR1 in the network to establish a connection to the remote device LSR2 through a multi-layer control technology, and sends the configuration parameters required for correspondingly generated interfaces on two ends for establishing the connection to the LSR1 while triggering the LSR1 to establish the connection. Alternatively, the network management server triggers the local device LSR1 in the network to establish a connection to the remote device LSR2. The interface configuration parameters of the local device LSR1 and the remote device LSR2 for establishing the connection are pre-configured in the network management server, so that the network management server sends the configuration parameters required for correspondingly generated interfaces on two ends for establishing the connection to the LSR1 while triggering to establish the connection. Merely two manners for obtaining the interface configuration parameters have been described above, and any other method for obtaining the interface configuration parameters should fall within the protection scope of the embodiment of the present disclosure.

In step S202, an interface parameter object is set according to the obtained interface configuration parameters.

In the embodiment of the present disclosure, the local device LSR1 adds the Interface Parameter Object to an RSVP-TE signaling. The object carries the configuration parameters of an upper layer interface, which includes the parameter of the local device LSR1 and the parameter of the remote device LSR2, after the connection has been established. The parameters to be configured include one or more of the following parameters of the local service LSR1 and the remote device LSR2: IP addresses, routing protocols, and routing parameters. The routing protocol is a protocol running on interfaces, for example, an RSVP, or an open shortest path first (OSPF). The routing parameter includes an area number, hello interval, and dead interval of the OSPF, as well as other more complicated parameters, for example, an interface authentication type and an authentication password. A format of the Interface Parameter Object may be defined as follows.

The Local IP Address is an interface address of the local device LSR1 that initiates the connection, and the Remote IP Address is an interface address of the remote device LSR2. If the address of the remote device LSR2 needs to be lent, the Remote IP Address may be filled as 0.0.0.0. When the signaling is returned, the remote end sets the field as the lent address. The Optional TLV is formed by 0 or a plurality of Type-Length-Values (TLVs), and each TLV defines one of the above configuration attributes.

In step S203, the RSVP-TE signaling carrying the interface configuration parameters is sent.

The local device LSR1 maps the interface configuration parameters to the interface parameter object for being coded, and then sends the configuration parameter of the remote device LSR2 to the remote device LSR2 through the RSVP-TE signaling. After receiving the RSVP-TE signaling, the remote device LSR2 decodes the interface parameter object carried in the RSVP-TE signaling, and obtains the interface configuration parameter of the remote device. If accepting the interface configuration parameter sent by the LSR1, the remote device LSR2 configures an interface of the LSR2 according to the received interface configuration parameter of the remote device, and establishes the corresponding service connection. Then, the remote device LSR2 sends receiving acknowledgement information to the local device LSR1, so as to notify the LSR1 of the information that the LSR2 accepts the parameter configuration and successfully establishes the service connection. If the remote device LSR2 does not accept the configuration of certain parameters, the remote device LSR2 directly may reject to establish the corresponding service connection, and may also only reject to establish the service connection corresponding to the unaccepted parameters, and then sends the receiving acknowledgement information to the LSR1, so as to notify the LSR1 of the information that the LSR2 rejects to establish the service connection.

Figure 4:
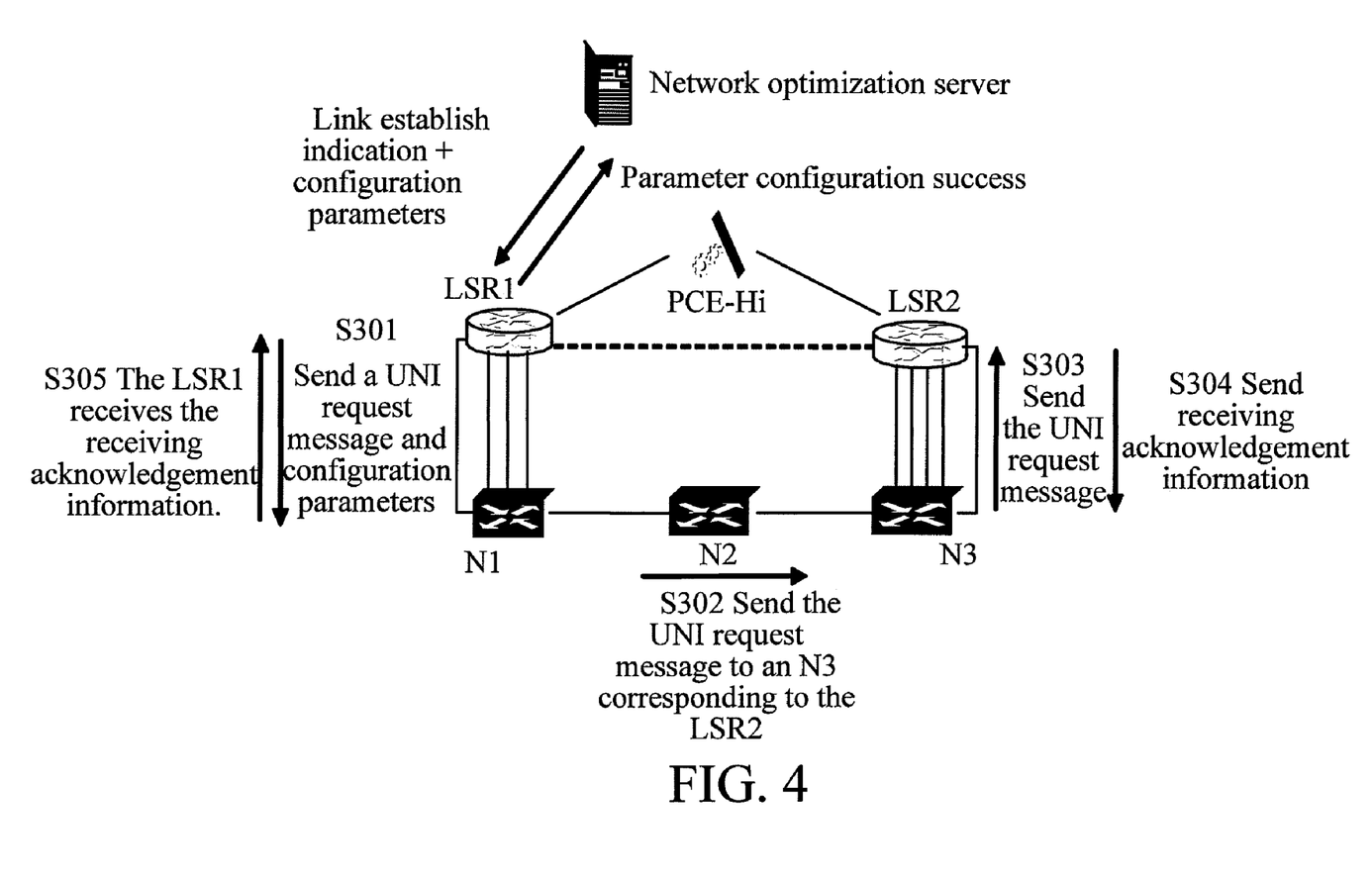
FIG. 4 is a flow chart of a method for establishing a service connection according to still another embodiment of the present disclosure.

FIG. 4 is a flow chart of a method for establishing a service connection according to still another embodiment of the present disclosure. Referring to FIG. 4, a process of establishing a router connection between an LSR1 and an LSR2 by using a UNI, configuring interfaces correspondingly generated on two ends for dynamically establishing the connection, and establishing the service connection specifically includes the following steps.

In step S301, the LSR1 sends a UNI request message to a local optical transmission network (OTN) device N1, for requesting to establish an optical layer ODU connection to the LSR2.

Before the LSR1 sends the UNI request message to the N1, a network optimization server triggers the LSR1 to establish a connection to the remote device LSR2, and sends the configuration parameters required for correspondingly generated interfaces on two ends for establishing the connection to the LSR1 while triggering to establish the connection. The LSR1 adds an interface parameter object to the UNI request message, and maps the interface configuration parameters sent by the network optimization server to the interface parameter object for being coded.

In step S302, the N1 requests a path computation element-low (PCE-Lo) to compute a path and sends the UNI request message to an N3 corresponding to the LSR2.

In step S303, the N3 sends the UNI request message to the remote device LSR2.

In step S304, the remote device LSR2 sends receiving acknowledgement information.

After receiving the UNI request message, the remote device LSR2 decodes the interface parameter object carried in the UNI request message, and obtains the interface configuration parameter of the remote device. If accepting the interface configuration parameter sent by the LSR1, the remote device LSR2 configures an interface of the LSR2 according to the received interface configuration parameter of the remote device, and establishes the corresponding service connection. Then, the remote device LSR2 sends receiving acknowledgement information to the local device LSR1, so as to notify the LSR1 of the information that the LSR2 accepts the parameter configuration and successfully establishes the service connection. If the remote device LSR2 does not accept the configuration of certain parameters, the remote device LSR2 may directly reject to establish the corresponding service connection, and may also only reject to establish the service connection corresponding to the unaccepted parameters, and then sends the receiving acknowledgement information to the LSR1, so as to notify the LSR1 of the information that the LSR2 rejects to establish the service connection.

In step S305, the local device LSR1 receives the receiving acknowledgement information.

In the embodiment of the present disclosure, the interface parameter object is added to the RSVP-TE signaling, and the interface parameter object carries the interface configuration parameters including the interface configuration parameter of the local device and the interface configuration parameter of the remote device. Then, the RSVP-TE signaling carrying the interface configuration parameter of the remote device is sent to the remote device. After receiving the RSVP-TE signaling, the remote device sends the receiving acknowledgement information, so as to complete the negotiation and configuration of the interface parameters, thereby realizing automatic configuration and negotiation of the interface parameters, and saving manpower resources.

Figure 5:
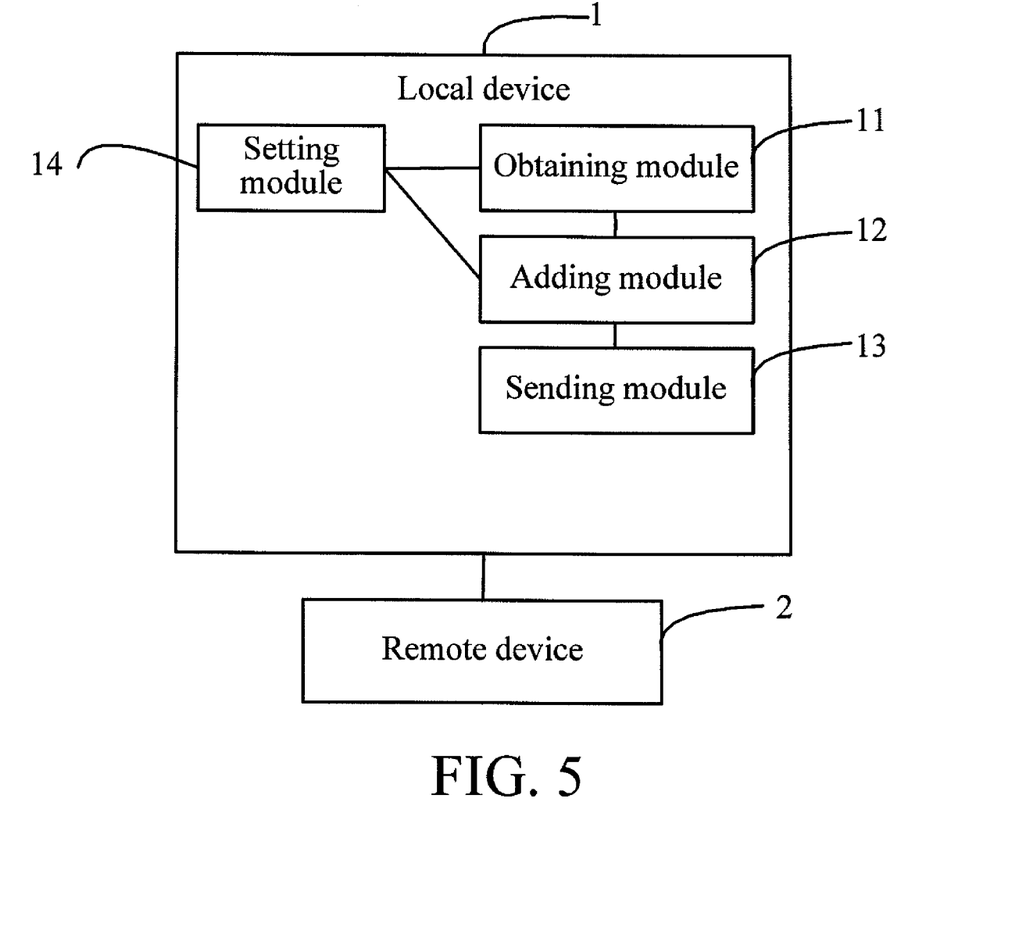
FIG. 5 is a structural view of a system for establishing a service connection according to an embodiment of the present disclosure.

FIG. 5 is a structural view of a system for establishing a service connection according to an embodiment of the present disclosure. Referring to FIG. 5, the system includes a local device 1 and a remote device 2.

The local device 1 is configured to obtain interface configuration parameters including an interface configuration parameter of the remote device 2, add an interface parameter object carrying the interface configuration parameters to a UNI request message, and send the UNI request message carrying the interface configuration parameter of the remote device 2 to the remote device 2, so as to establish a service connection with the remote device 2.

The remote device 2 is configured to receive the UNI request message sent by the local device 1, obtain the interface configuration parameter of the remote device 2, and configure an interface of the remote device 2 according to the interface configuration parameter of the remote device 2.

The remote device 2 is further configured to send receiving acknowledgement information to the local device 1 after configuring the interface of the remote device 2.

The local device 1 further includes an obtaining module 11, an adding module 12, and a sending module 13.

The obtaining module 11 is configured to obtain the interface configuration parameters, in which the interface configuration parameters include the interface configuration parameter of the remote device 2.

The adding module 12 is configured to add the interface parameter object to the UNI request message, in which the interface parameter object carries the interface configuration parameters.

The sending module 13 is configured to send the UNI request message carrying the interface configuration parameter of the remote device 2 to the remote device 2.

The interface configuration parameters may further include an interface configuration parameter of the local device 1, and the local device 1 may further include a setting module 14.

The setting module 14 is configured to set the interface parameter object added by the adding module 11 according to the interface configuration parameters obtained by the obtaining module 13, and set an interface of the local device 1 according to the interface configuration parameter of the local device 1 in the interface configuration parameters.

In the embodiment of the present disclosure, the local device 1 adds the interface parameter object to the UNI request message, in which the interface parameter object carries the interface configuration parameters including the interface configuration parameter of the local device 1 and the interface configuration parameter of the remote device 2. Then, the local device 1 sends the interface configuration parameter of the remote device 2 to the remote device 2 through the UNI request message. After receiving the UNI request message, the remote device 2 sends the receiving acknowledgement information, so as to complete the negotiation and configuration of the interface parameters, thereby realizing automatic configuration and negotiation of the interface parameters, and saving manpower resources.

Through the above description in the detailed description, it is clear to persons skilled in the art that the present disclosure may be accomplished through hardware such as a processor, or through software plus necessary universal hardware platform. Base on this, the technical solutions of the present disclosure may be embodied in the form of a software product. The software product may be stored in one or more nonvolatile storage media (for example, CD-ROM, USB flash drive, or removable hard disk) and contain several instructions configured to instruct a computer equipment (for example, a personal computer, a server, or a network equipment) or a processor to perform the method according to the embodiments of the present disclosure.

The above descriptions are merely several embodiments of the present disclosure, but not intended to limit the present disclosure. Any modification, equivalent replacement, and improvement made without departing from the spirit and principle of the present disclosure fall within the scope of the present disclosure.

What is claimed is:

1. A method for establishing a service connection, comprising:
  obtaining, by a first label switching router (LSR), interface configuration parameters, wherein the interface configuration parameters comprise an interface configuration parameter of a local device and an interface configuration parameter of a remote device, the interface configuration parameter of the local device and the interface configuration parameter of the remote device are configuration parameters required for correspondingly generated interfaces on the local device and the remote device for establishing the connection from the local device to the remote device, wherein the local device is the first LSR, the remote device is a second LSR, wherein the interface configuration parameters comprise at least one of the following parameters of the local device and the remote device: interface Internet Protocol (IP) addresses, routing protocols, and routing parameters;

adding, by the first LSR, an interface parameter object to a user network interface (UNI) request message, wherein the interface parameter object carries the interface configuration parameters; and sending, by the first LSR, the UNI request message carrying the interface configuration parameter of the remote device to the remote device, so as to establish a service connection with the remote device;

wherein the first LSR sets an interface of the local device according to the interface configuration parameter of the local device in the interface configuration parameters after obtaining the interface configuration parameters;

wherein sending the UNI request message carrying the interface configuration parameter of the remote device to the remote device comprises: sending, by the first LSR, the UNI request message to a local optical transmission network (OTN) device, sending, by the local OTN device, the UNI request message to an OTN device corresponding to the second LSR, sending, by the OTN device corresponding to the second LSR, the UNI request message to the second LSR.

2. The method for establishing a service connection according to claim 1, wherein after sending the UNI request message carrying the interface configuration parameter of the remote device to the remote device, the method further comprises:

obtaining, by the remote device, the interface configuration parameter of the remote device from the UNI request message, setting an interface of the remote device according to the interface configuration parameter of the remote device, and sending receiving acknowledgement information to the local device.

3. The method for establishing a service connection according to claim 1, wherein the UNI request message adopts a resource reservation protocol (RSVP)-traffic engineering (TE) signaling.

4. A system for establishing a service connection, comprising:

a local device and a remote device, wherein the local device is a first label switching router (LSR), the remote device is a second LSR, the system further comprising a local optical transmission network (OTN) device of the first LSR and an local OTN device of the second LSR, wherein the first LSR is configured to obtain interface configuration parameters comprising an interface configuration parameter of the first LSR and an interface configuration parameter of the second LSR, the interface configuration parameter of the first LSR and the interface configuration parameter of the second LSR are configuration parameters required for correspondingly generated interfaces on the first LSR and the second LSR for establishing the connection from the first LSR to the second LSR, set an interface of the first LSR according to the interface configuration parameter of the first LSR in the interface configuration parameters, wherein the interface configuration parameters comprise at least one of the following parameters of the local device and the remote device: interface Internet Protocol (IP) addresses, routing protocols, and routing parameters, add an interface parameter object carrying the interface configuration parameters to a user network interface (UNI) request message, and send the UNI request message carrying the interface configuration parameter of the second LSR to the local OTN device of the first LSR to establish a service connection with the second LSR;

the local OTN device of the first LSR is configured to send the UNI request message carrying the interface configuration parameter of the second LSR to the local OTN device of the second LSR;

the local OTN device of the second LSR is configured to send the UNI request message carrying the interface configuration parameter of the second LSR to the second LSR; and the second LSR is configured to receive the UNI request message sent by the first LSR, obtain the interface configuration parameter of the second LSR, and configure an interface of the second LSR according to the interface configuration parameter of the second LSR.

5. The system for establishing a service connection according to claim 4, wherein the second LSR is further configured to send receiving acknowledgement information to the first LSR after configuring the interface of the second LSR.

6. A label switching router (LSR) comprising: a processor configured to:

obtain interface configuration parameters, wherein the interface configuration parameters comprise an interface configuration parameter of the LSR and an interface configuration parameter of a remote LSR, the interface configuration parameter of the LSR and the interface configuration parameter of the remote LSR are configuration parameters required for correspondingly generated interfaces on the LSR and the remote LSR for establishing the connection from the LSR to the remote LSR, wherein the interface configuration parameters comprise at least one of the following parameters of the LSR and the remote LSR: interface Internet Protocol (IP) addresses, routing protocols, and routing parameters;

add an interface parameter object to a user network interface (UNI) request message, wherein the interface parameter object carries the interface configuration parameters;

send the UNI request message carrying the interface configuration parameter of the remote LSR to the remote LSR, so as to establish a service connection with the remote LSR; and set an interface of the LSR according to the interface configuration parameter of the LSR in the interface configuration parameters after obtaining the interface configuration parameters;

wherein the LSR sends the UNI request message to the remote LSR by: sending, by the LSR, the UNI request message to a local optical transmission network (OTN) device, sending, by the local OTN device, the UNI request message to an OTN device corresponding to the remote LSR, and sending, by the OTN device corresponding to the remote LSR, the UNI request message to the remote LSR.

* * * * *